M. MACKIE & J. B. FISHER.
INTERNAL COMBUSTION ENGINE.
APPLICATION FILED FEB. 5, 1917.

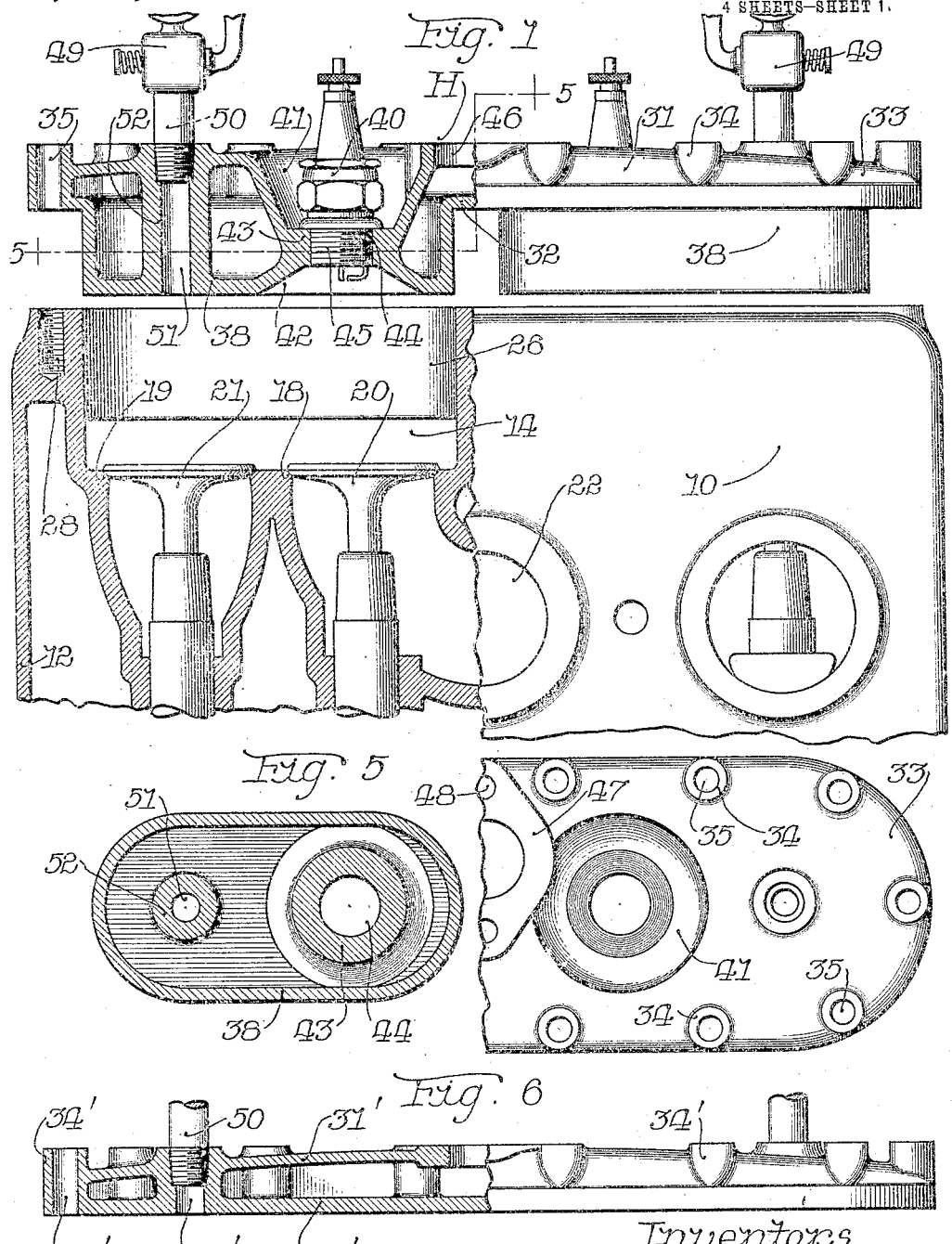

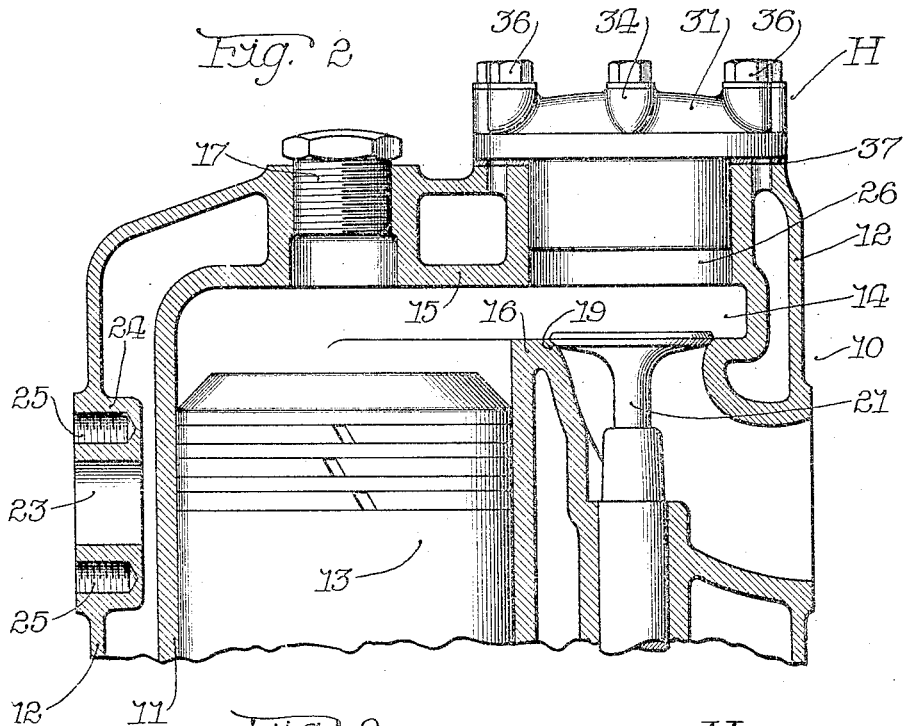
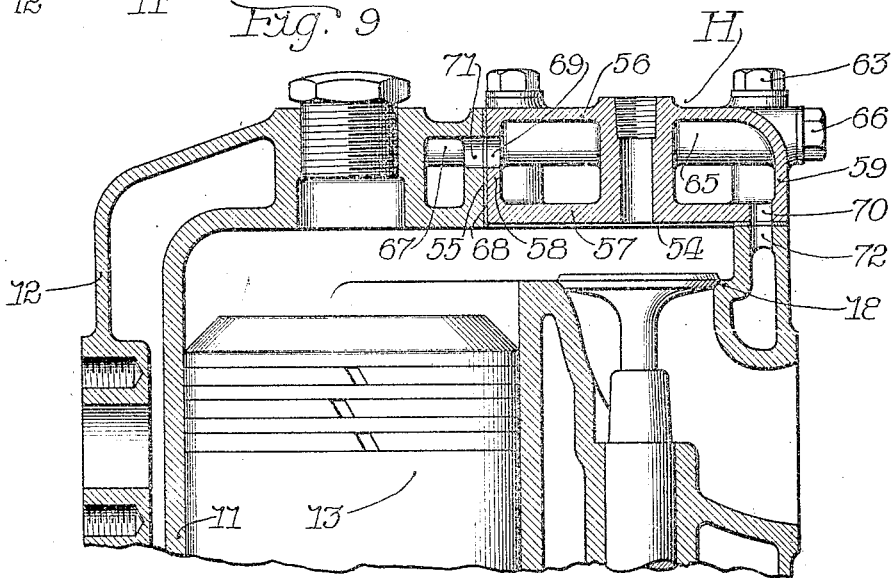

1,251,798.

Patented Jan. 1, 1918.
4 SHEETS—SHEET 3.

Inventors
Mitchell Mackie
James B. Fisher
By Brown, Hanson & Roettcher
Attorneys

UNITED STATES PATENT OFFICE.

MITCHELL MACKIE AND JAMES B. FISHER, OF WAUKESHA, WISCONSIN, ASSIGNORS TO WAUKESHA MOTOR COMPANY, OF WAUKESHA, WISCONSIN, A CORPORATION OF WISCONSIN.

INTERNAL-COMBUSTION ENGINE.

1,251,798.  Specification of Letters Patent.  Patented Jan. 1, 1918.

Application filed February 5, 1917. Serial No. 146,612.

*To all whom it may concern:*

Be it known that we, MITCHELL MACKIE and JAMES B. FISHER, citizens of the United States, residing at Waukesha, in the county of Waukesha and State of Wisconsin, have invented certain new and useful Improvements in Internal-Combustion Engines, of which the following is a full, clear, concise, and exact description, reference being had to the accompanying drawings, forming a part of this specification.

The present invention relates broadly to internal combustion engines and the like and more particularly to new and useful improvements in cylinder heads therefor.

Those skilled in the art are familiar with the occurrences in the combustion chamber or chambers of an internal combustion engine wherein ignition of the explosive gases is had. Owing to the overheating of the valve plugs and adjacent parts, there is caused premature ignition and cracking of the gases, resulting in a loss of power and excessive deposition of carbon and consequent inefficiency in operation. Where the spark plug form of ignition is employed, the plugs very often become overheated, causing cracking of the insulation and a resultant leaking of the cylinder head or short-circuiting of that particular plug.

With the foregoing in mind we have designed a cylinder head for internal combustion engines and the like, the primary object of which is to provide means to more effectively cool that portion of the combustion chamber adjacent the exhaust valves, to cool the spark plugs and to eliminate in a large degree the costly machine work necessary on the present valve plugs and the apertures into which the same are placed.

Another object of our invention is to provide a cylinder head which practically completely eliminates premature explosion and cracking of the gases due to overheating, but does not chill the gases being fed through the intake manifolds and valves.

Our invention also contemplates the provision of a cylinder head which may be cast as a single integral unit and may be applied to the engine cylinders now in use without material alteration of the structure of the same. The cylinder head is constructed so that the combustion chamber is not enlarged which insures the same degree of compression.

Other objects of our invention not hereinbefore set forth will appear from the following detailed description and claims, taken with an inspection of the accompanying drawings, in which—

Figure 1 is a fragmental side elevational view of an internal combustion engine showing one form of our improved cylinder head, parts being shown in section and the head lifted;

Fig. 2 is a fragmental vertical sectional view showing the cylinder head in place;

Fig. 5 is a fragmental section taken on the line 5—5 of Fig. 1 looking in the direction of the arrows;

Fig. 6 is a fragmental elevational view of a modified form of the invention;

Fig. 9 is a vertical sectional view taken on the line 9—9 of Fig. 7.

Figure 3:
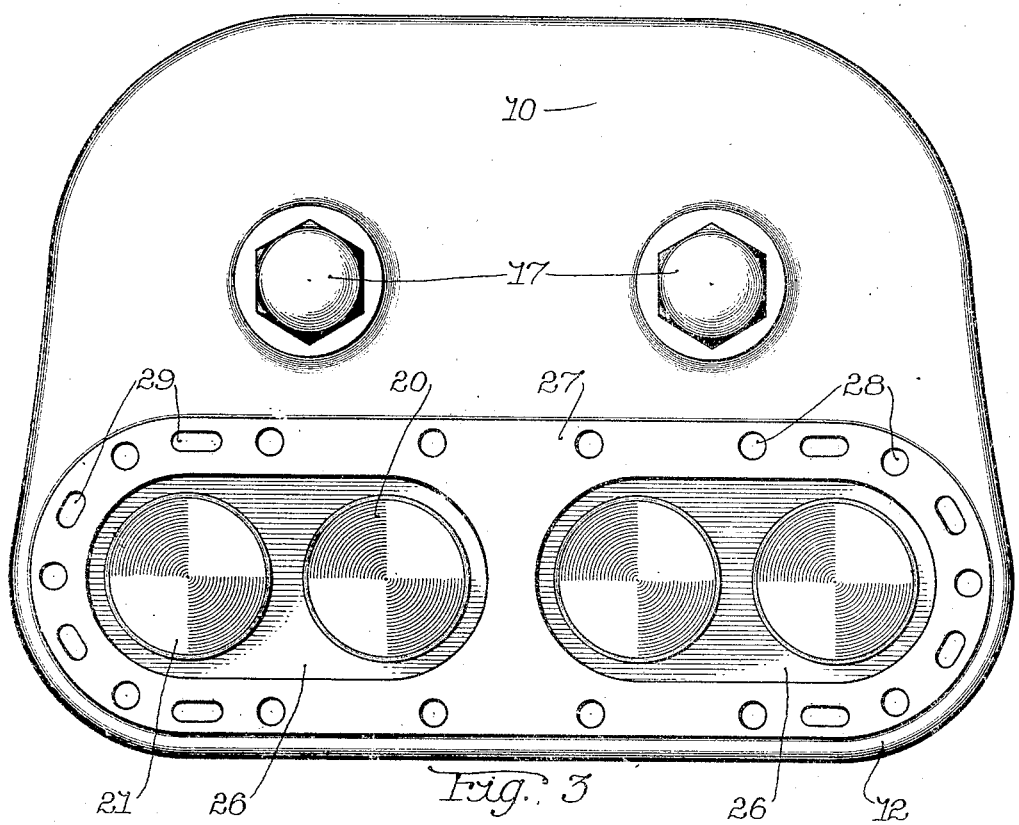
Fig. 3 is a top plan with the cylinder head removed.
Figure 4:
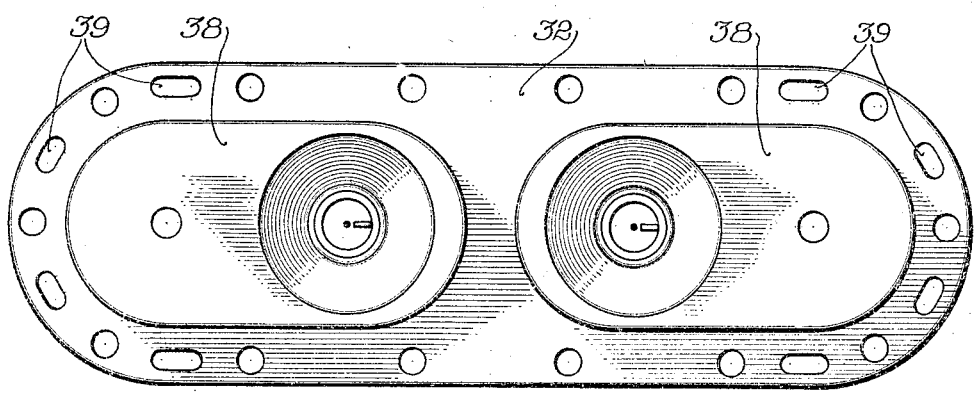
Fig. 4 is a bottom plan of the cylinder head.

Referring more particularly to the drawings, wherein similar characters of reference designate like and corresponding parts throughout the various views, 10 designates as an entirety the cylinder structure of a standard internal combustion engine, particularly of the type employed in motor vehicles and the like.

The engine structure is composed of the main cylinder wall 11 and the outer wall or jacket 12 in spaced relation thereto. As in the usual construction the pistons 13 are arranged in the cylinders and adapted for reciprocation therein.

The cylinders 11 each communicate with a laterally disposed combustion chamber 14 formed by virtue of the top inner wall 15 and the partition 16, said partition having the valve seats for the intake and exhaust valves arranged therein in the usual manner. Access may be had to the interior of the cylinders by removing the screw plugs 17. Said valve seats are designated 18 and 19 and in the preferred form of the invention are best shown in Fig. 1. The intake valve seat is designated 18 and receives the valve 20 which latter is controlled in any of the usual ways. A valve 21 engages the seat 19 and serves as the exhaust valve.

In Fig. 1 a two-cylinder unit is shown, the inlet valve having a common inlet port 22 and the outlet valve having separate outlet ports. In Fig. 2 the water or cooling agent inlet is designated 23 and is reinforced by an annular enlargement 24 adjacent the inlet. The enlargement is provided with screw recesses 25 to receive the bolts for connecting the liquid supply conduit.

In the ordinary type of multi-cylinder engine there are provided a plurality of openings above each of the valves so as to permit access to the valve seat to grind the same and to allow removal of the valves when desired.

In the present instance the openings referred to are combined and instead of four openings, as would be provided in the ordinary two-cylinder engine, we provide two openings, designated 26, said openings being elongated and substantially elliptical in shape. The top portions of the cylinder adjacent the openings 26 are machined to provide a plane surface 27 to receive the cylinder head described in detail hereinafter. A plurality of threaded openings 28 are provided in the upper ends of the cylinders to receive bolts for securing the cylinder head to the cylinder. A plurality of outlet openings 29 are provided in the upper ends of the cylinders opening to said planed surface, said openings serving as outlets for the water jackets as will hereinafter appear.

The cylinder head of our invention comprises preferably a hollow body generally designated H and formed with top and bottom walls 31 and 32. The top wall is preferably slightly concavo-convex in shape, the margins thereof being curved downwardly as at 33 to join the bottom wall. The cylinder head is cast in a single piece preferably. In the form of the cylinder head shown in Fig. 1 we provide means to carry the spark plug and engine priming devices. A plurality of enlargements 34 are provided along the margin of the cylinder head, said enlargements having vertical openings 35 therethrough registering with the threaded openings 28 in the upper end of the engine structure. Retaining bolts 36 are engageable with the threaded openings 28 through the openings 35 to retain the cylinder head in position. Any suitable packing means may be employed—for instance, a gasket 37. A pair of hollow enlargements 38 are provided on the bottom wall 32 of the cylinder head, said enlargements corresponding in shape to the openings 26 and being adapted for reception snugly therewithin. A plurality of openings 39 are provided in the bottom wall 32 of the cylinder head, said openings registering with the openings 29, hereinbefore referred to, whereby to afford communication between the cylinder cooling jacket and the cooling chamber of the cylinder head.

The spark plugs 40 are mounted preferably as best shown in Fig. 1. A pair of depressions 41, only one of which is shown, are formed in the top wall 31 of the cylinder head and coöperate with depressions 42 in the bottom of the enlargements 38 to form a horizontal partition 43 provided with a threaded opening 44 to receive the threaded portion 45 of the spark plug. The outlet for the cooling medium is designated 46 and is formed in the top wall 31 of the cylinder head about midway the length thereof. A plurality of outlets may be provided, if desired. A flange 47 is formed adjacent the openings and said flange is provided with openings 48 to receive fastening means, not shown, whereby the outlet conduit may be attached. The priming valves are designated 49 and are the usual construction, said valves having threaded extensions 50 for connection in the outer ends of vertical ducts 51 formed in vertical posts 52 cast integrally with the top and bottom walls 31 and 32 of the removable head.

In Fig. 6 a modified form of the cylinder head is shown, in this instance the head merely embodying top and bottom walls 31' and 32', the contour and construction being practically identical. However, in this form of the invention the enlargements 38 are omitted.

However, the primer tube 50 may be connected to the threaded free ends of the apertures 51' similarly to the connection described in the foregoing. Enlargements 34' are provided on the cylinder head and said enlargements are provided with openings 35' to receive fastening means similarly to the openings 35 referred to hereinbefore.

Figure 7:
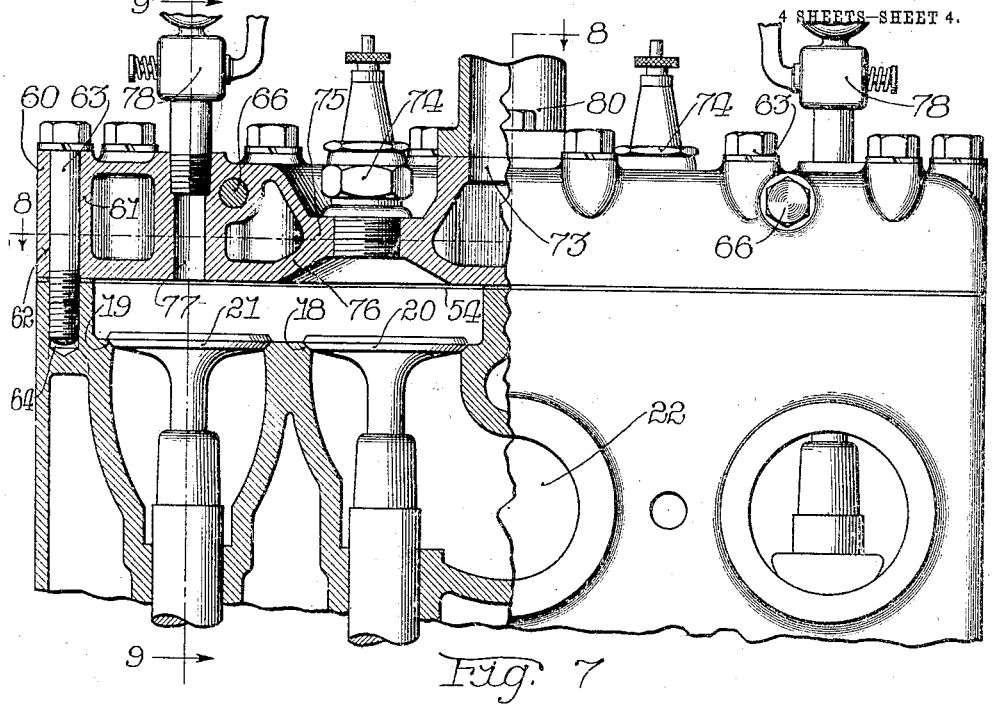
Fig. 7 is a fragmental side elevation of a further modified form of our invention.

In the modified forms of my invention shown in Figs. 7 and 9, the standard parts of the engine have been designated similarly to the parts shown in Fig. 1 and therefore these parts will not be referred to in detail in connection with this modification.

Figure 8:
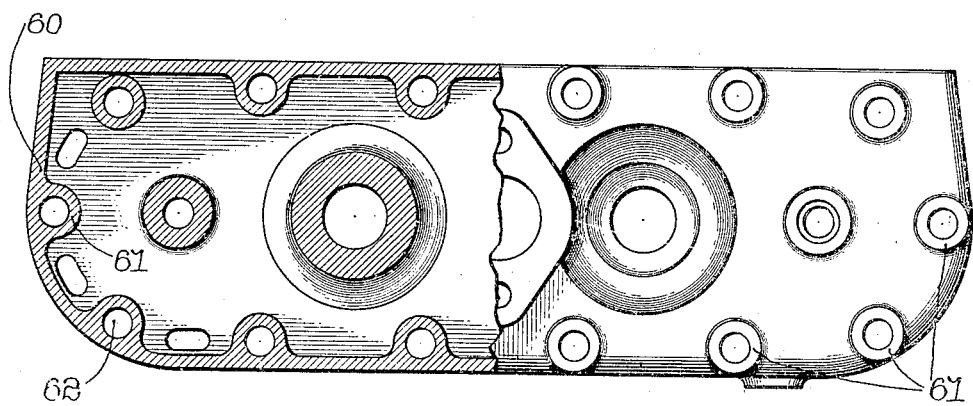
Fig. 8 is a fragmental plan section taken on the line 8—8 of Fig. 7.

In the modification referred to, and best shown in Figs. 7 to 9, the upper end of the engine structure is cut away along the valve side to provide a ledge or shelf 54 and a shoulder 55. The cylinder head of this modified form of the invention is designated H' and is composed of a body having top and bottom walls 56 and 57 connected by an inner side wall 58 and an outer side wall 59. The cylinder head is also provided with end walls 60. Of course, it is to be understood that the cylinder head is shaped so as to conform to the contour of the engine structure on the valve side. A plurality of enlargements 61 are provided on the vertical walls of the cylinder head, said enlargements having each an opening, said openings being designated 62 to receive retaining bolts 63, the threaded ends of the bolts engaging in threaded openings 64 formed in the top of the engine structure. Transverse tubular enlargements 65 are formed interiorly of the cylinder head and are adapted to receive bolts 66, the inner ends of which are adapted to engage in threaded enlargements 67 formed in the shoulder 55. A gasket 68 serves to prevent leakage between the cylinder head and the engine structure. It will thus be seen that the bolts 63 and 66 serve to effectively maintain the cylinder head against accidental displacement.

The cylinder cooling jacket is formed by the outer wall 12 and the cylinder wall 11 and communication is had between the cylinder head H' and said cooling jacket through the openings 69 and 70 formed in the inner side wall and bottom of said cylinder head. Openings 71 and 72 in the shoulder 55 and shelf 54, respectively, register with the openings 69 and 70 and permit circulation of the cooling medium from the cooling jacket into the cylinder head. It will be noted that in the provision of the alined openings 69 and 71 we provide for circulation of the liquid or other cooling medium at the highest point so that there is no chance for steam to pocket against the wall forming the shoulder 55.

The outlet for the cooling medium is designated 73 and is provided in the top wall of the cylinder head about midway the length thereof. The spark plugs designated 74 are mounted in practically the same manner in which the spark plugs are mounted in the preferred form of the invention, namely, by means of a horizontal partition 75 supported by webs 76. The priming opening or openings designated 77 communicate with a priming valve 78. The outlet conduit 80 is connected over the opening 73 so that the cooling liquid exhausts from the cylinder head through said conduit.

In use, the preferred form of our invention is applied as shown, and it will be apparent that circulation of the liquid through the cylinder head around the spark plug and into the enlargements 38 will serve to cool the same and prevent premature ignition and cracking of the gases. At the same time the cooling of the parts is not such that the explosive mixture is chilled. The position of the opening communicating between the water jacket and the removable cylinder head on the preferred form of our invention facilitates circulation from the highest point of the water jacket so that pocketing of the steam in the jacket is impossible. This is an important point and we desire to lay particular stress upon the same.

In the modified form of the invention shown in Figs. 7 to 9 the operation of the head is practically identical with that shown in Figs. 1 to 5.

Of course, it will be readily apparent that various modifications of the manner of attaching the cylinder head may be made without departing from the spirit and scope of the invention.

We also lay stress upon the location of the openings affording communication between the heads and jackets in all forms of the invention shown. The location is such that the exhaust valves are cooled,—the points at which heat is not desired as a rule,—and the openings are also so arranged that the liquid is taken from the jackets into the head at the highest point in the jacket to prevent pocketing steam.

From the above description taken in connection with the accompanying drawings, it is thought that a clear and comprehensive understanding of the construction, operation, and advantages of our invention may be obtained, and while we have described our invention as embodying specific features of construction, it is to be understood that we do not limit ourselves to such details, but reserve the right to make changes therein which do not depart from the spirit and scope of the invention as claimed.

We claim:

1. In combination, an engine structure having jacketed cylinders with combustion chambers, said jackets being provided with cooling liquid outlets on the upper ends, a hollow head receivable on the engine structure over the combustion chamber only and having openings therein to register with said outlets, an outlet on said head, and a plurality of hollow enlargements carried by the head and communicating therewith for reception in the combustion chambers to cool the same.

2. In combination, an engine structure having cylinders and jackets, said jackets having circulating openings, adjacent inlet and exhaust valves and a combustion chamber adjacent thereto, and a cooling head mounted on the engine structure over the combustion chambers and provided with openings communicating with said jackets, circulation of liquid between the head and jackets being had adjacent the exhaust valve.

3. In combination, an engine structure having cylinders and jackets, said jackets having circulating openings, adjacent inlet and exhaust valves and a combustion chamber adjacent thereto, a cooling head mounted on the engine structure provided with openings, the openings in the jackets and cooling head being adapted to communicate, said communication being effected adjacent the exhaust valve, and a hollow enlargement carried by the head and receivable in said combustion chamber.

4. In combination, an engine structure having cylinders and jackets, said jackets having circulating openings, adjacent inlet and exhaust valves, and a combustion chamber adjacent thereto, a head mounted on the engine structure and provided with openings communicating with said jacket openings, said openings in the jackets and head being located whereby communication between the head and jackets is had adjacent the exhaust valve and from the highest point in the jackets to prevent pocketing steam.

5. In combination, an engine structure having cylinders, combustion chambers, and inlet and exhaust valves adjacent the latter, the upper portion of said structure being cut away to form a ledge and a shoulder, a hollow head receivable on said ledge and adapted to abut said shoulder, means to secure the head on said ledge, and said head and jackets communicating to circulate a cooling medium.

6. In combination, an engine structure having cylinders, combustion chambers, and inlet and exhaust valves adjacent the latter, the upper portion of said structure being cut away adjacent the combustion chamber and valve to form a ledge and a shoulder, a cooling liquid circulating plate receivable on said ledge and to abut said shoulder, said plate communicating with the cooling system of the engine structure.

7. In combination, an engine structure having cylinders, combustion chambers, and inlet and exhaust valves adjacent the latter, the upper portion of said structure being cut away to form a ledge and a shoulder, a hollow liquid circulating plate receivable on said ledge and adapted to abut said shoulder, a gasket between said plate and said ledge and shoulder, and means to secure said plate on said ledge.

8. In combination, an engine structure having cylinders, combustion chambers, and inlet and exhaust valves adjacent the latter, the upper portion of said structure being cut away adjacent the combustion chamber and valve to form a ledge and shoulder, a hollow head receivable on said ledge and adapted to abut said shoulder, said head communicating with said jacket to circulate a cooling medium, and a plurality of horizontal and vertical bolts engaging through said head with the shoulder and ledge to maintain the head rigidly in position thereon.

9. In combination, an internal combustion engine comprising a cylinder structure having cooling jackets and combustion chambers open at their upper ends, a head therefor comprising a hollow body mounted upon the combustion chambers and extending only over said chambers, means to afford communication between the jackets and the heads to circulate a cooling medium, and means to fasten said head on the cylinder structure.

10. In combination, an internal combustion engine comprising a cylinder structure having cooling jackets and combustion chambers open at their upper ends, a head therefor comprising a hollow body mounted upon the combustion chambers and extending over said chambers only, means on the head to maintain the cubical contents of the combustion chambers fixed, means to afford communication between the jackets and the head, and means to fasten said head on the cylinder structure.

In witness whereof we hereunto subscribe our names, this 31st day of January, 1917.

MITCHELL MACKIE.
JAMES B. FISHER.

Copies of this patent may be obtained for five cents each, by addressing the "Commissioner of Patents, Washington, D. C."